United States Patent [19]

Eglise

[11] Patent Number: 4,611,205

[45] Date of Patent: Sep. 9, 1986

[54] DATA COLLECTION SYSTEM

[75] Inventor: David Eglise, Windsor, England

[73] Assignee: Mars, Inc., McLean, Va.

[21] Appl. No.: 542,144

[22] Filed: Oct. 14, 1983

[30] Foreign Application Priority Data

Oct. 18, 1982 [GB] United Kingdom ................ 8229654

[51] Int. Cl.[4] ........................ H04Q 9/00; G06K 5/02; G06F 7/00

[52] U.S. Cl. ............................... 340/825.35; 364/465; 194/200; 194/217; 235/385

[58] Field of Search ...................... 340/825.33, 825.35, 340/825.54; 364/465; 194/1 N; 235/382, 381, 385

[56] References Cited

U.S. PATENT DOCUMENTS

| | | | |
|---|---|---|---|
| 3,120,602 | 2/1964 | Lagarde . | |
| 3,436,530 | 4/1969 | Faude . | |
| 3,551,652 | 12/1970 | Faude | 200/42 |
| 3,754,122 | 8/1973 | Dinapoli et al. | 73/490 |
| 3,757,089 | 9/1973 | Hockler | 194/4 R |
| 3,779,357 | 1/1974 | Haller et al. | 194/5 |
| 3,786,960 | 1/1974 | Young | 222/2 |
| 3,858,181 | 1/1974 | Goldsby et al. . | |
| 3,878,371 | 4/1975 | Burke | 324/94 |
| 3,934,143 | 1/1976 | Maurer et al. . | |
| 3,959,632 | 3/1976 | Trehn | 340/51 |
| 4,007,355 | 2/1977 | Moreno | 340/825.34 |
| 4,038,525 | 7/1977 | Freeman . | |
| 4,072,930 | 2/1978 | Lucero | 364/411 |
| 4,143,943 | 3/1979 | Otten | 194/1 N |
| 4,146,778 | 3/1979 | Wain | 194/1 N |
| 4,180,206 | 12/1979 | Takahashi | 235/419 |
| 4,213,118 | 7/1980 | Genest | 235/382.5 |
| 4,216,461 | 8/1980 | Werth | 340/825.35 |
| 4,263,945 | 4/1981 | Van Ness | 340/825.35 |
| 4,272,757 | 6/1981 | McLaughlin et al. | 340/825.35 |
| 4,305,059 | 12/1981 | Benton | 340/825.33 |
| 4,306,219 | 12/1981 | Main | 340/825.54 |
| 4,350,238 | 9/1982 | Shah et al. | 194/1 N |
| 4,354,613 | 10/1982 | Desai et al. | 221/4 |
| 4,366,481 | 12/1982 | Main et al. | 340/825.54 |
| 4,369,442 | 1/1983 | Werth et al. | 340/825.35 |
| 4,412,292 | 10/1983 | Sedam | 340/825.36 |
| 4,482,964 | 11/1984 | Berstein et al. | 364/465 |

FOREIGN PATENT DOCUMENTS

| | | | |
|---|---|---|---|
| 18718 | 12/1980 | European Pat. Off. . | |
| 0109758 | 5/1984 | European Pat. Off. . | |
| 1470813 | 4/1977 | United Kingdom . | |
| 1549191 | 7/1979 | United Kingdom . | |
| 2075732 | 11/1981 | United Kingdom . | |
| 2082361 | 3/1982 | United Kingdom . | |
| 2082816 | 3/1982 | United Kingdom . | |
| 2086114 | 6/1982 | United Kingdom | 340/825.35 |
| 2115156 | 9/1983 | United Kingdom . | |

OTHER PUBLICATIONS

IBM Technical Disclosure Bulletin, vol. 13, No. 10, Mar. 1971, D. Maiwald: "Error Recovery in Data Transmission", pp. 3162-3163.

*Primary Examiner*—Donald J. Yusko

*Attorney, Agent, or Firm*—Davis Hoxie Faithfull & Hapgood

[57] ABSTRACT

A system for collecting data from machines is particularly but not exclusively, suited for use as a vending machine audit system, and, in the preferred embodiment, comprises an audit controller which records transaction data relating to the operation of the machine and periodically is caused to transfer the data into a data storage module in the form of a non-volatile memory. The module can be removed and inserted into a down-loading machine at a central location which extracts the data and uses it to provide a transaction record.

The audit controller stores in the module a predetermined indication code only after first checking that the transaction data has been correctly stored in the module. The indication code signifies to the down-loading machine that the data was correctly transferred to the module. There is thus no need to lock the module into the controller during data transfer, because removal of the module during data transfer will not result in the production of an incorrect transaction record.

Transfer of data to the module takes place only if the module stores an appropriate security code. If the customer forgets his own security code, access to the data is permitted by storing in the module a "skeleton" code known to the manufacturer.

30 Claims, 10 Drawing Figures

Figure 1:
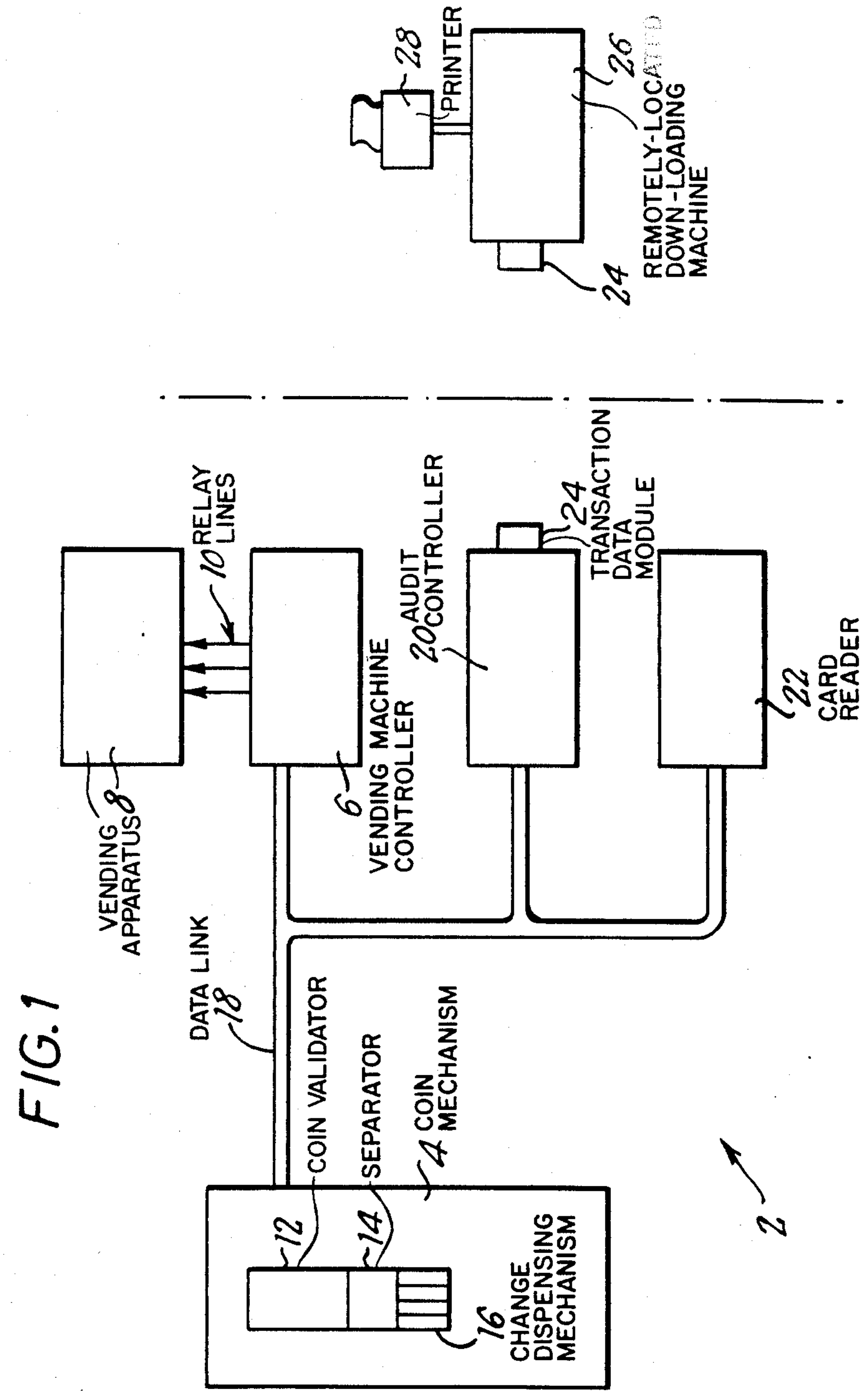

PRINTER
28
26
24
REMOTELY-LOCATED
DOWN-LOADING
MACHINE
10 RELAY LINES
VENDING APPARATUS 8
6 VENDING MACHINE CONTROLLER
20 AUDIT CONTROLLER
24 TRANSACTION DATA MODULE
22 CARD READER
DATA LINK 18
COIN VALIDATOR
SEPARATOR
4 COIN MECHANISM
12
14
16 CHANGE DISPENSING MECHANISM
2

REQUEST AUDIT DATA

CALL AUDIT

SERVICE AUDIT

AUDIT CONTROLLER

DOWN-LOADER

DATA COLLECTION SYSTEM

This invention relates to data collection systems, and is particularly but not exclusively related to accountability or audit systems for use with coin or credit handling devices, such as vending machines.

A known form of audit system is described in European Patent Publication No. 18718. This system comprises a device which is fitted to a vending machine and which is adapted to receive a removable module containing a non-volatile memory. Data concerning transactions which have been carried out by the vending machine is transferred into the module's memory, and the module is then removed and at a later stage fitted to a machine which can read out the contents of the module's memory and then print out a record of the transactions. The audit device has a locking arrangement to ensure that the module is locked into the device during the transfer of the data to the module's memory. The lock is released only after all the data has been transferred. This is done to ensure that the module cannot be inadvertently or deliberately removed from the device during data transfer, which would result in the data in the module being corrupted and/or incomplete.

Other known accountability systems use more sophisticated data storage modules in the form of intelligent "probes". In one such system, the probes are not physically fitted to the audit devices, but instead have an infrared sensor/transmitter which is pointed at another sensor/transmitter on the audit device so as to allow information to be transferred to and from the probe. The probe has a fairly large memory capacity, and can be used to service several different audit systems connected to respective vending machines.

U.S. Pat. No. 4,306,219 describes another such system, in which the probe communicates with the audit unit over an optical link. The probe and audit unit perform a handshaking routine to verify the soundness of the link. The probe includes a tape recorder for storing received data.

These types of systems require the use of "intelligent" probes, i.e. ones which can test the integrity of the received data, for example by checking the parity, etc. However, the cost of this is generally justified because the probe is used for a number of different vending machines.

However, there are certain environments in which the cost of "intelligent" probes is not justified. For example, if an owner has a number of vending machines which are very remote from each other, it would be impractical to arrange for a single service man to visit all these with the same probe at regular intervals. In this case, it would be better to use a system in which each vending machine would have its own inexpensive, non-intelligent module (which need only comprise a single-chip EAROM), and a different person at each vending machine could use the module and then send it to a central location at which records for the respective vending machines are printed out.

It would therefore be desirable to improve the known system which needs a mechanical arrangement for locking the modules into the audit devices during data transfer, and which therefore suffers from the expense and poor reliability of mechanical devices and the possibility of interference therewith, and it would also be desirable to avoid the need for "intelligent" modules such as the probes referred to above.

According to a first aspect of the invention, there is provided a data collection system for a machine which generates data relating to its operation, the system comprising data collection means having a removable data storage module into which the collection means is operable to load said operation data, characterised in that the collection means is further operable to check that the data has been correctly loaded into the module, and, if so, to store in the module a predetermined indication code, which after removal of the module from the collection means can be recognised and thereby used as an indication that a successful operation data transfer has taken place.

The invention is particularly useful in the area of audit systems, in which the collection means will be an audit means which collects transaction data relating to the operation of a cash- or credit-handling machine, and will be described in this context hereafter. The invention is, however, also useful in other areas, as will be explained.

Using a system of the invention, the module locking arrangement described above can be dispensed with. Instead, the data in the module is checked after it has been loaded therein to ensure that it is correct. The predetermined indication code is stored in the module if, and only if, the data has been correctly loaded.

A down-loading machine can be arranged to print out a report of the transaction data if, and only if, the predetermined indication code is stored in the module. Thus, any corruption of the data caused by a user accidentally or deliberately detaching the module from the audit means during data transfer will not result in a false record being produced.

In a preferred embodiment of the invention, the audit means keeps an "interim" record of transaction data for loading in the module. The interim record is deleted from the audit means' memory every time it is loaded into the module, after which a new interim record is started. The system is desirably arranged so that the interim record is deleted only if the audit means has checked that the data has been correctly loaded into the module. In this way, if transaction data is not correctly stored in a module, this does not affect the interim record which is eventually printed out after the transaction data is correctly transferred to a new module.

The transaction data may include, instead of or preferably in addition to the interim record referred to above, a "total" record comprising data relating to transactions carried out throughout a fairly long period, for example from installation of the audit means, rather than merely data relating to operations carried out since the last time the audit means was accessed.

In the preferred embodiment, the audit means keeps a file of "total" transaction data, and another file of "interim" transaction data. In one arrangement, every time a transaction takes place, both files are updated. When a module is used, information from both files is stored therein, and the interim file is deleted.

Alternatively, the audit means could be arranged to update the "total" file only when it is accessed using a module. The "total" file is then updated merely by adding the contents of the interim file to the contents of the total file.

In a preferred embodiment, the module stores a security code which has to match a code stored in the audit means before data transfer is permitted. This ensures that only authorised personnel supplied with modules containing the correct security code can gain access to the audit means, and access is precluded to, for example, owners of other chains of vending machines which might have the same type of audit system but which use modules with different security codes.

However, it is always possible that at some stage or other a non-authorised person may get to learn of the security code, as a result of which the data provided by the audit means may be disclosed to, or altered by, such non-authorised people.

It is therefore occasionally desirable to be able to change the security code for a particular vending machine or group of vending machines. This could, however, result in difficulties. For example, there may be circumstances in which an owner could lose any record of his latest security code and therefore be unable to access the data in his audit means. Also, the transition from old to new security codes has to be handled very carefully, to make sure that only modules or probes containing new security codes are used to access those audit means in which the security codes have been altered, whereas only modules or probes containing the old security codes are used to access audit means in which the security codes have not yet been altered.

It would therefore be desirable to provide a system which facilitates the changing of security codes.

Preferably, therefore, the audit means is responsive to an alteration instruction stored in the module for changing the security code to which it will respond.

This arrangement makes it easy for an owner to change the security code for one or more of his vending machines. All he needs to do is to insert the alteration instruction in the module so that when this is used to access transaction data in an audit means, the security code is changed at the same time. Thus, it is not necessary to physically transfer an audit means or components thereof to a different location, which could mean taking the audit system out of action, in order to change the security code.

Preferably, the alteration instruction is effective only if the module also stores the original security code.

The module is of course normally reusable. A particularly convenient way of changing security codes would therefore be to insert an alteration instruction into a module whenever it is down-loaded, so that when it is next used it will cause an alteration of the security code. The storage of the alteration instruction in the module is preferably done automatically by the down-loading machine on completion of the reading-out of the transaction data from the module.

In the preferred embodiment, the alteration instruction takes the form of the new security code, and is recognised as such by being stored in a special location in the module.

Preferably, provision is made for situations in which a module containing the old security code and an alteration instruction is used with an audit means in which the security code has already been altered. This can be achieved by permitting access to the transaction data either if the security code in the module matches that of the audit means, or if the alteration instruction (i.e. the new security code) matches the security code of the audit means.

Preferably, the system is so arranged that the audit means will not transfer transaction data to a moule which has the above-mentioned predetermined indication code stored therein. In this way, there are no adverse consequences if a user accidentally tries to use a module which has already had transaction data transferred thereto.

The above arrangement can be conveniently achieved by arranging for the predetermined code to over-write a security code stored in the module.

According to a second aspect of the invention, there is provided a data collection system for a machine which generates data relating to its operation, the system comprising data collection means having a removable data storage module into which the collection means is selectively operable to load said operation data, the module storing a security code and the collection means being operable to perform a security code recognition operation on the module to determine whether the stored security code is appropriate to authorise loading of operation data, wherein the collection means is operable to determine as appropriate a first security code which is peculiar to that collection means (or to a particular group of collection means), and a second security code which is common to that collection means and other collection means (or to collection means outside said group). As above, this aspect of the invention will be described further in the context of audit systems for cash- or credit-handling machines, but is also useful in other areas.

The common security code, which is referred to herein as a "KEY" code, would preferably be known only to a very few people, for example only the manufacturers.

This arrangement has advantages in those situations in which an owner loses any record of his security code.

The advantages are particularly significant when, as in the perferred embodiment of the invention, a security code in a storage module is erased or over-written prior to the module being removed from the audit means so that the module cannot accidentally be re-used before the data has been read out. The down-loading machine for reading out the data could also be arranged to insert a security code into the module so that the latter can be re-used after the transaction data has been read out. Alternatively, another machine could be used for the re-insertion of the security code. In either event, it is desirable for security reasons that the machine be incapable of indicating the current security code which is stores. Preferably, the security code can be altered in the manner described above, by entering the new security code into the machine. However, this should desirably only be allowed if the user also enters the current security code.

Such an arrangement is convenient and secure, but leads to a substantial risk of problems occurring due to forgetting or losing the current security code. The user needs to know the code very infrequently, such as when he wants to change the code or if the machine for re-inserting the code in the module fails or needs servicing, in which case the code stored in the machine might be lost or otherwise become unavailable for use. Accordingly, he could very easily forget the code. When he does need to know the code, he cannot obtain this by examining modules which have been used in the field, or by accessing the code from the machine. He could keep a written record of the code, but this is unsafe and in any event the record could be lost.

Such problems can be extremely serious, as they could effectively cause an owner to lose a great deal of information concerning the operation of all his vending machines.

An arrangement according to the second aspect of the invention avoids these problems by enabling an owner to access his audit means using a module containing the "second security code", referred to herein as the "skeleton" code, which would match the "KEY" code. In practice, this could actually be carried out by the manufacturer, who would have modules containing the skeleton code, which code would be common to systems sold to different customers.

In the preferred embodiment of the invention, the use of a module containing the skeleton code results in the stored security code which is perculiar to the audit means (or the particular group of audit means) being transferred to the module, so that by reading out the data in the module the owner or the manufacturer could determine what the "lost" security code is. This, however, is not absolutely essential; the system could alternatively be arranged so that use of the skeleton code results in the unknown security code being changed to a new, known code.

This aspect of the invention is useful both for systems which use "non-intelligent" modules, as well as for systems which use "intelligent" modules such as the probes referred to above.

The audit means of the preferred embodiment is, in fact, operable to transfer transaction data both to non-intelligent modules, and to intelligent modules such as the probes previously mentioned, the particular method of transfer being selected by the audit means in accordance with which of these devices is being used to access it.

In the preferred embodiment to be described, the audit means can be accessed by modules in the form of non-volatile semi-conductor memories, which could be battery-powered memories but in the preferred embodiment are EAROM's. However, the modules could take other forms. For example, it is possible to use machine-readable cards, preferably ones carrying a magnetic recording medium but if desired punched cards could be use. Another alternative is to use magnetic tape, in which case, the modules could be in the form of cassettes similar to those used in audio tape-recorders. Some of the more important advantages of the invention are associated with ensuring a correct transfer of data to the module; the invention is therefore particularly, but not exclusively, applicable to systems in which the modules are physically, removably connected to the audit means, because other systems involving, for example, modules which communicate using infrared links would in general incorporate sophisticated and expensive circuits for ensuring data integrity.

Figure 2:
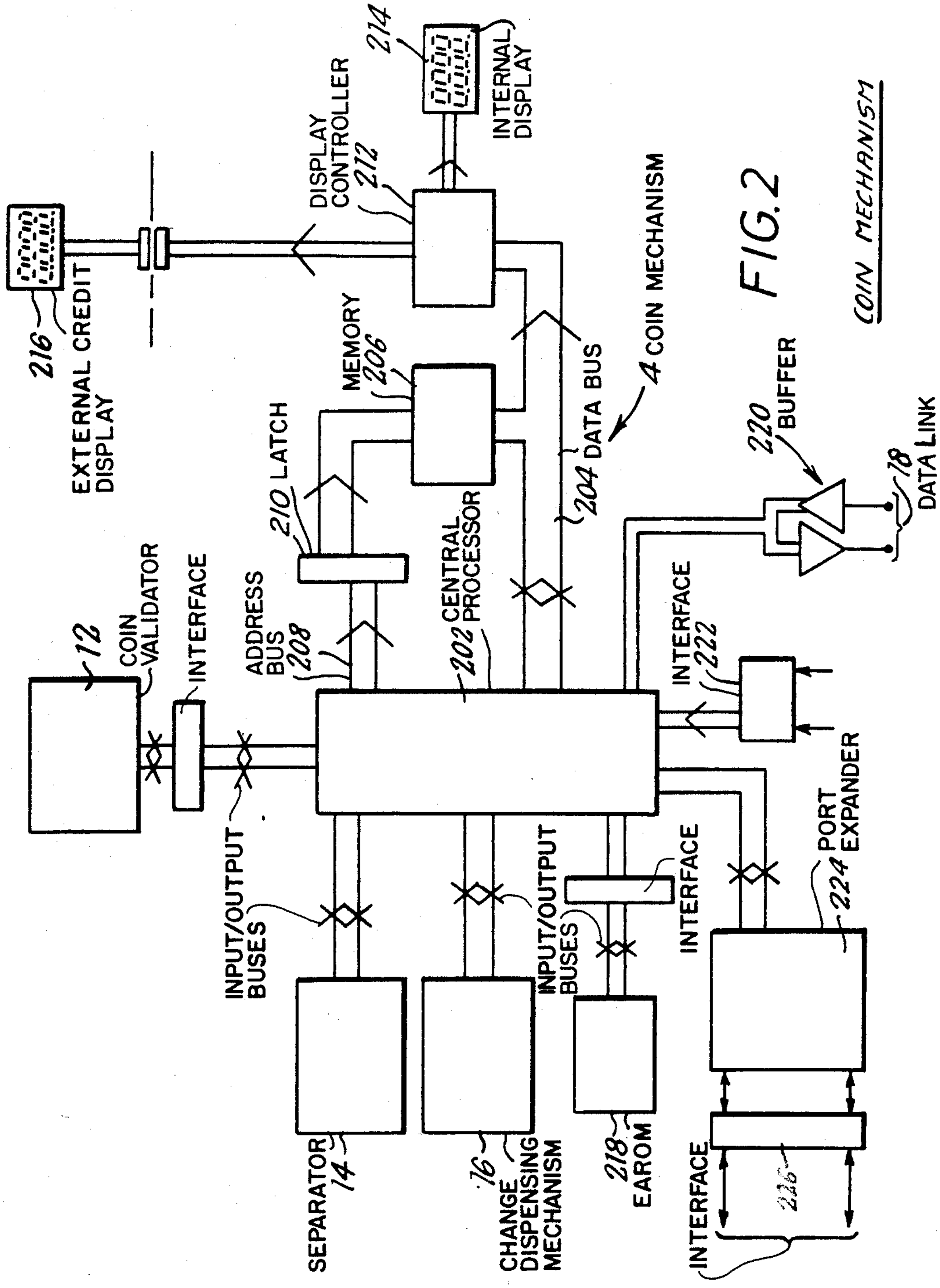
Figure 3:
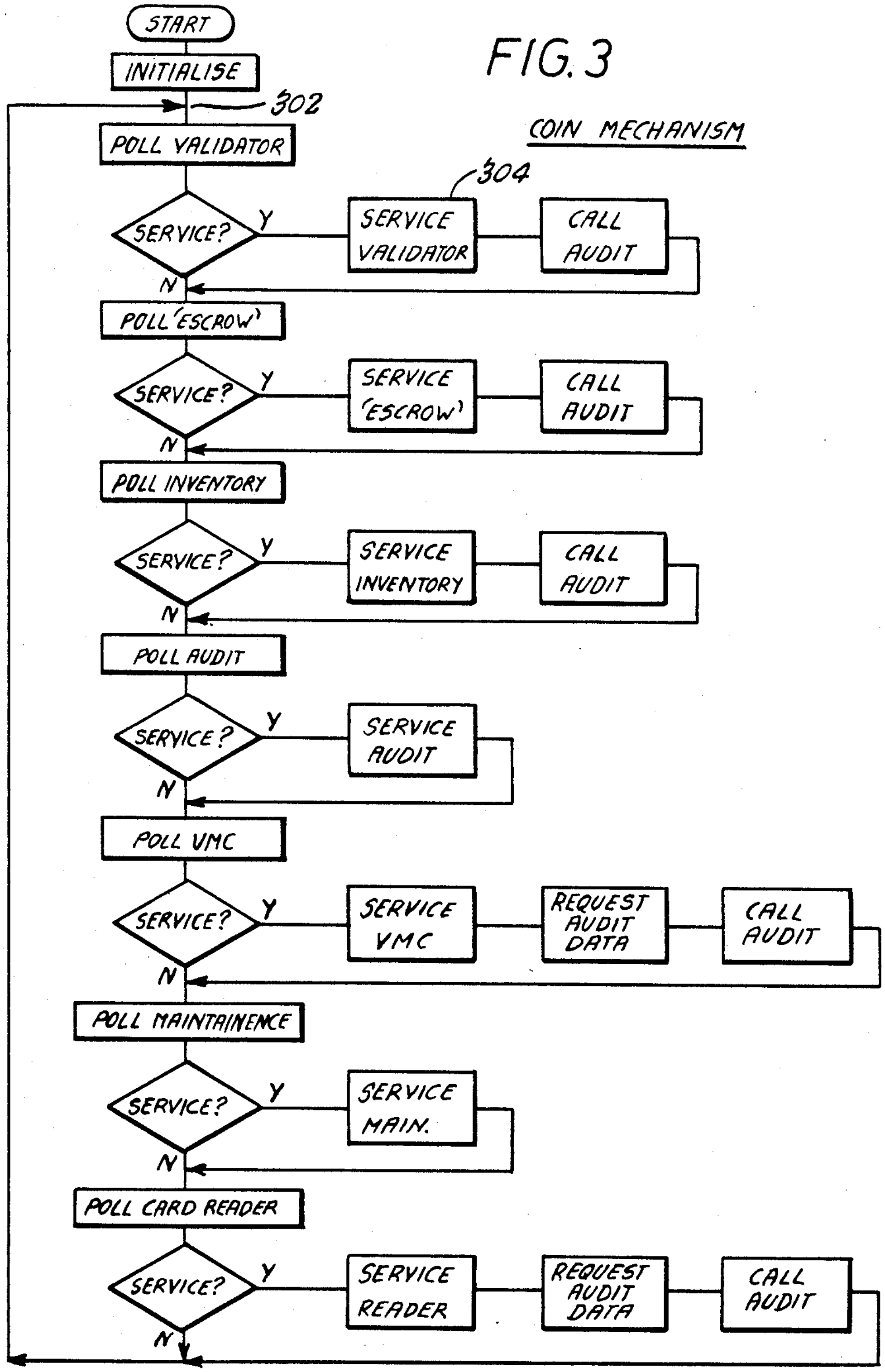
Figure 4:
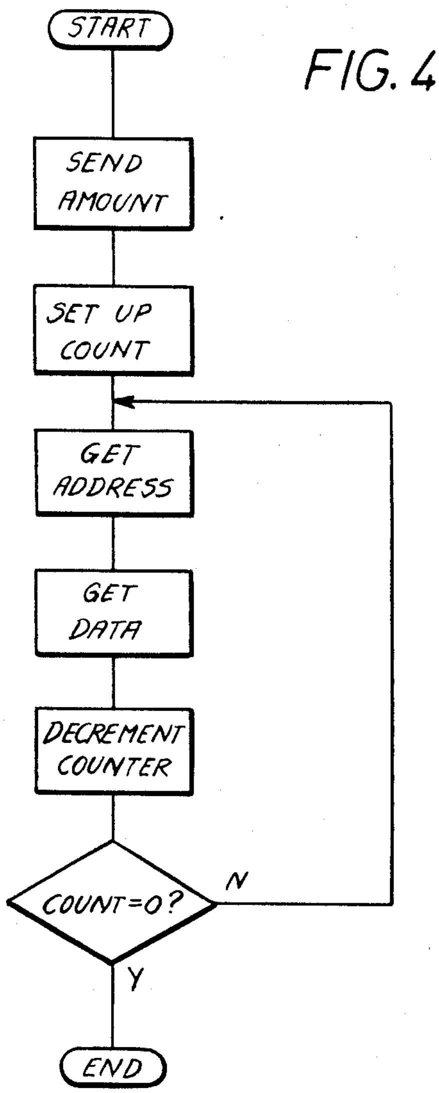
Figure 5:
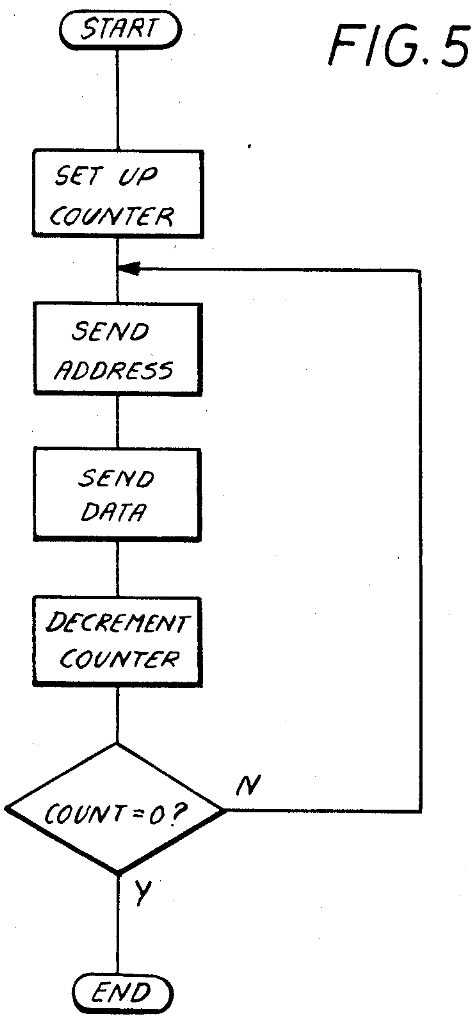
Figure 6:
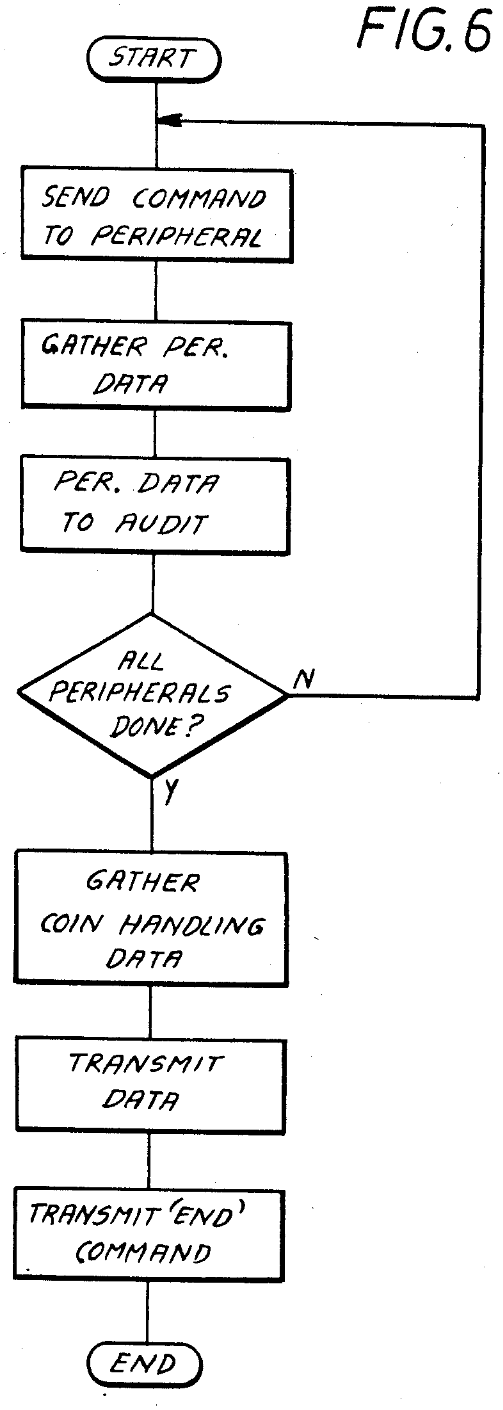
Figure 7:
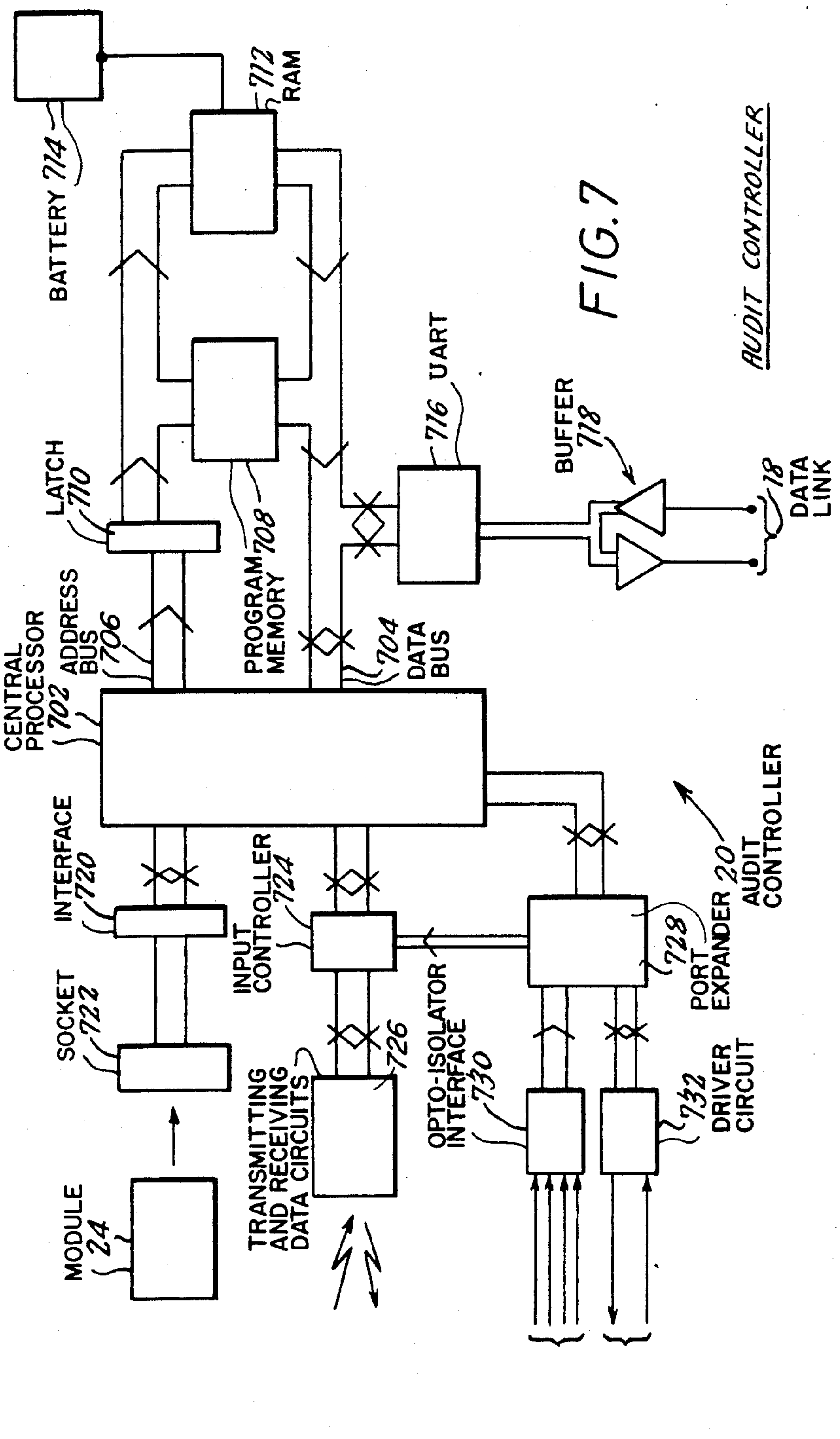
Figure 8:
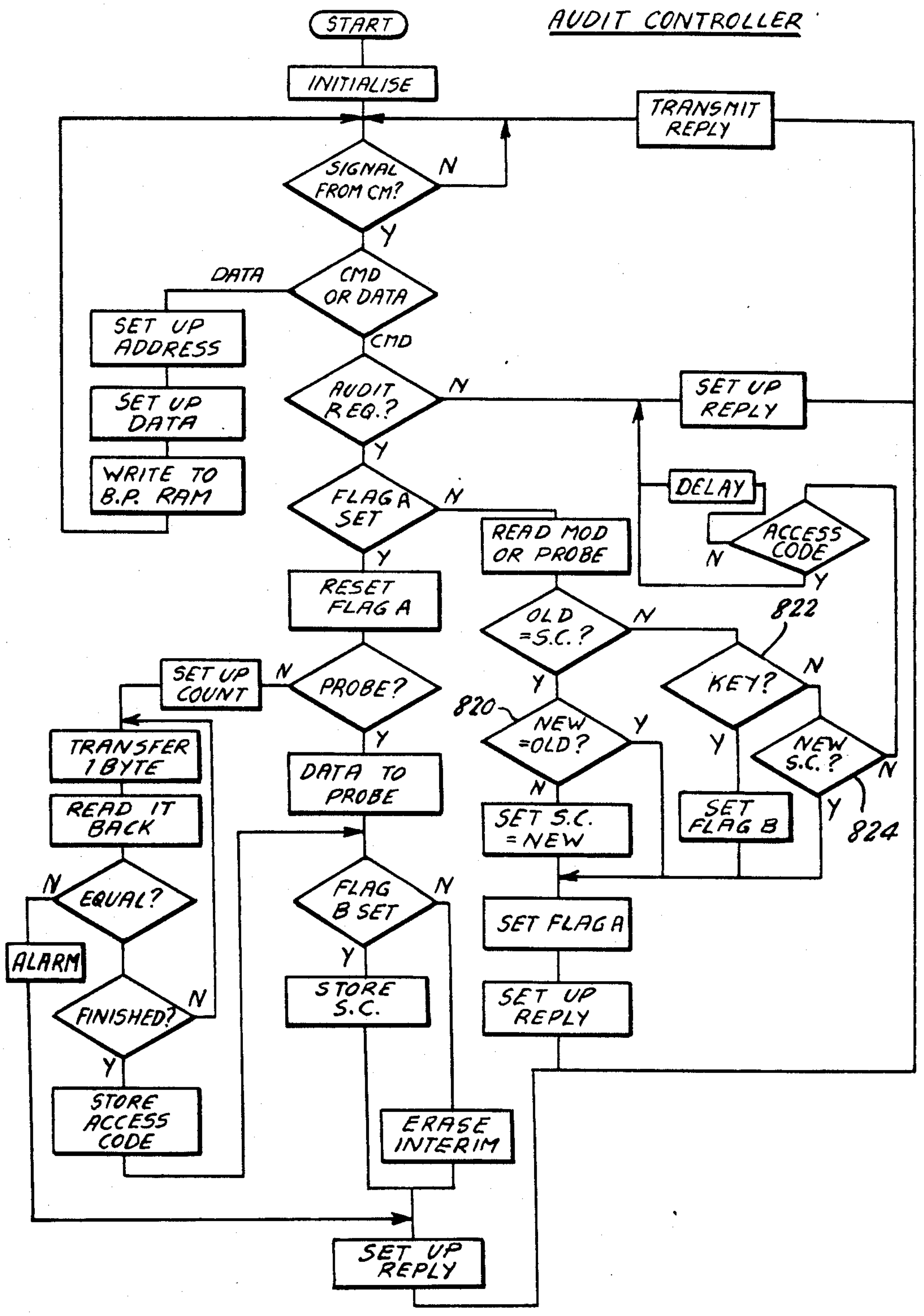
Figure 9:
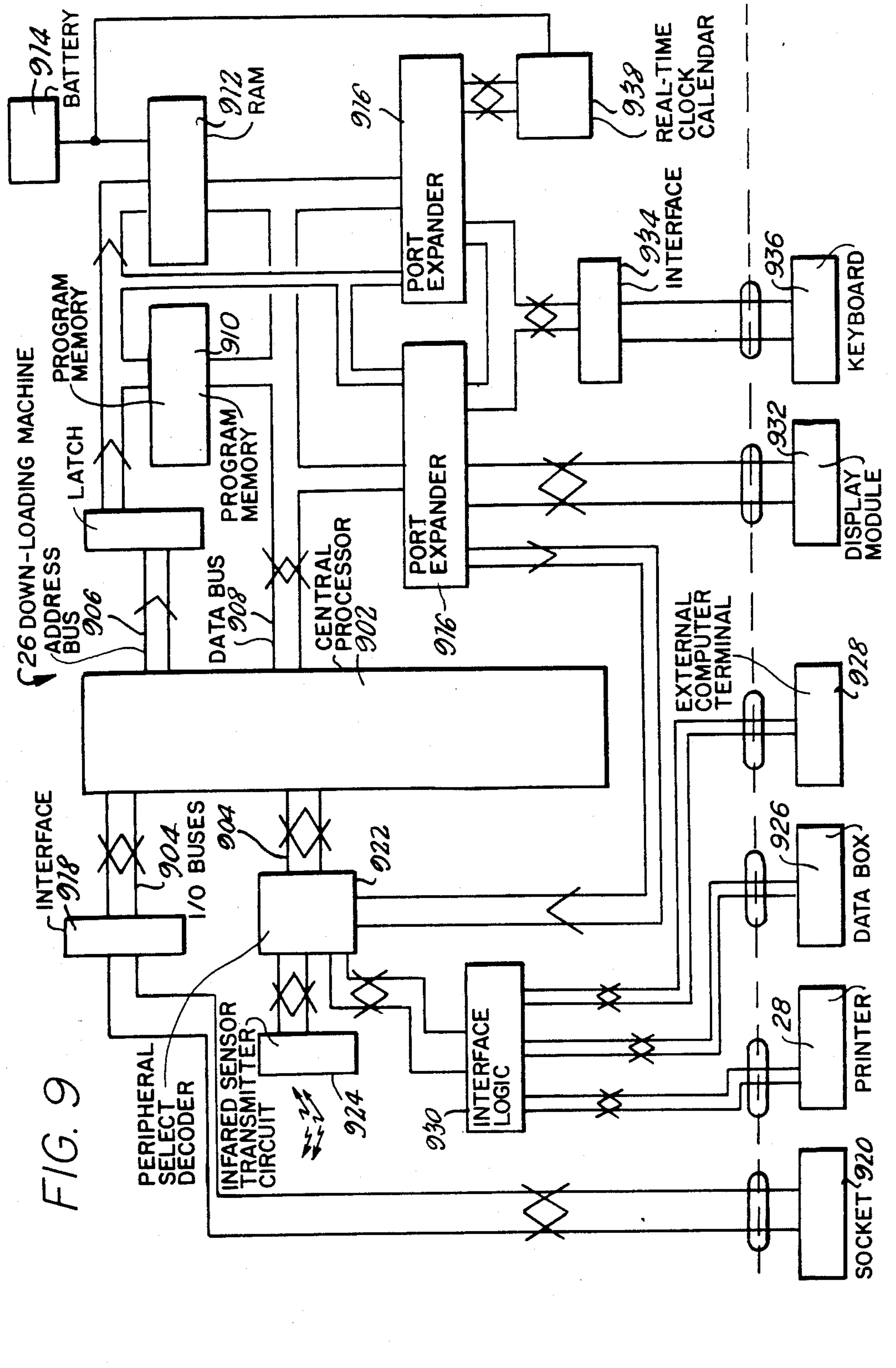
Figure 10:
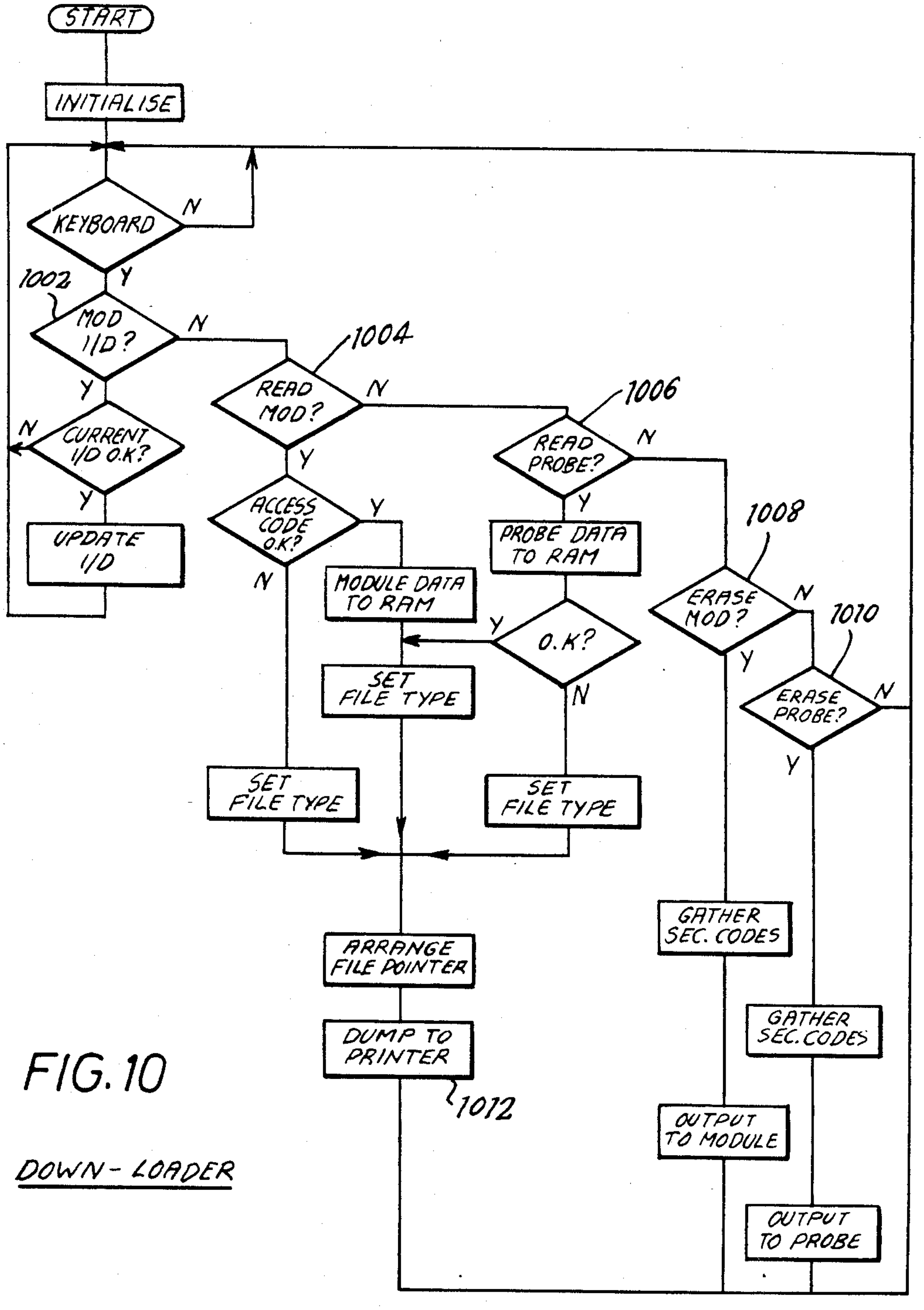

An arrangement embodying the invention will now be described by way of example with reference to the accompanying drawings, in which:

FIG. 1 is a block diagram of a vending machine incorporating an audit controller of a system according to the present invention, FIG. 2 is a block diagram of the coin mechanism of the machine of FIG. 1, FIG. 3 is a flow chart showing the operations carried out by the coin mechanism, FIGS. 4 to 6 are flow charts of routines carried out during the main operation described with reference to FIG. 3, FIG. 7 is a block diagram of the audit controller of the audit system of FIG. 1, FIG. 8 is a flow chart illustrating the operations carried out by the audit controller of FIG. 7, FIG. 9 is a block diagram of the down-loading machine of the audit system of FIG. 1, and FIG. 10 is a flow chart illustrating the operations carried out by the down-loading machine of FIG. 9.

Referring to FIG. 1, the vending machine 2 has a coin mechanism 4, a vending machine controller 6 and vending apparatus 8.

The vending apparatus 8 contains the mechanism for actually dispensing products. This is operated by the vending machine controller 6, which is connected to the vending apparatus 8 by relay lines indicated at 10.

The controller 6 is able to operate the apparatus 8 to dispense products only if sufficient credit has been accumulated. The accumulation of credit is handled by the coin mechanism 4. This contains a coin validator 12 which tests coins inserted into the machine to determine whether or not they are valid and, if so, the value of the coin. There is also a separator 14 which separates the coins so as to deliver them either to respective change tubes, a cashbox or a reject chute. The coin mechanism also contains a dispensing mechanism 16, including the change tubes, which can under the control of the coin mechanism 4 dispense coins in order to give change.

The coin mechanism 4 communicates with the vending machine controller 6 over a four-wire serial data link 18, whereby the coin mechanism 4 can send to the controller 6 information indicative of the amount of credit so that the vending machine controller can determine whether or not any particular product can be dispensed, and the controller 6 sends to the coin mechanism 4 information concerning the nature and value of products dispensed by the apparatus 8.

The data link 18 also communicates with an audit controller 20, to be described in more detail subsequently, and a card reader 22.

The card reader 22 accepts magnetically-encoded credit cards, and sends data concerning the cards over the data link 18 to the coin mechanism 4. A user can insert a card into the reader 22 in order to pay for items to be dispensed by the apparatus 8, instead of inserting money into the validator 12. The value of a product dispensed by the apparatus 8 is decremented from a credit value stored in the card, and the updated value written onto the card by the reader 22 before the user removes his card. It will be appreciated that both the card reader 22 and the coin handling apparatus, including the validator 12, separator 14 and dispensing apparatus 16, are optional.

Information concerning transactions carried out by the vending machine 2 is delivered to the audit controller 20. A module, schematically illustrated at 24, can be inserted into the controller 20 for transaction data to be written therein. The module 24 can then be removed, and at a later stage inserted into a remotely-located down-loading machine 26. The down-loading machine 26 is operable to read out the transaction data from the module 24, and then to print out a record of the transactions using a printer illustrated at 28.

The module 24 is an EAROM having, for example, one hundred or so storage locations. Before the module is inserted into the controller 20, most of these storage locations are empty (i.e. contain the number zero); two, however, contain security codes as will be described later.

The audit controller 20 has an electrical connector for receiving the module 24. The module 24 contains a link which shorts contacts of the connector on insertion of the module 24. The controller 20 detects this shorting, and interprets this as a request to initiate data transfer to the module 24. If desired, a button (not shown) could be connected in series with the contacts so that the button has to be pressed before data transfer is initiated, but this is not necessary.

Following data transfer, the module 24 will store the following data:

(a) identification data, for example numbers identifying the particular vending apparatus 8, coin mechanism 4 and controller 20 which are being used. There may also be information identifying the particular customer using the vending machine.

(b) Cash data. This will indicate the amount of cash received, the amount delivered to the cashbox, the amount dispensed as change and the amount delivered to the coin storage tubes.

(c) Product data. This may indicate the number of the respective products which have been dispensed, and possibly also the time various options have been selected. For example, for a hot drink dispenser, the product data may include how many times coffee has been dispensed, and also how many of those times the option of having sugar in the coffee was selected.

(d) "Servicing" data. This would include data indicating how the machine has been operating, so that it is possible to determine whether the machine has been, or is liable to be, faulty. The data may include the number of times there has been a power failure in any or all of the various parts of the machine, the times for which various mechanical parts were actuated during operations of the vending machine, etc. The servicing data may also include data concerning the "history" of the machine, such as information indicating how many times the coin mechanism has been replaced. Further servicing data may include information indicating how many times the machine has had to be serviced, and the reasons for the servicing. For example, it is possible to record how many times the dispensing machine has had to be opened to restock with cups, or to empty a waste bucket.

(e) Miscellaneous data. This may include a "coin scaling factor", which is a multiplier indicative of the actual value of the coins which the validator is intended to accept. For example, if the validator is arranged to increment a credit value by one, two and five depending on which of three valid coins is inserted, the coin scaling factor may be ten to represent that those coins have a value of ten pence, twenty pence and fifty pence, respectively. The miscellaneous data also includes a file identifier to be described subsequently.

The information referred to at (b) and (c) will include both interim data indicative of transactions which have occurred since the last time an audit was carried out, and total data which represents all transactions carried out over a fairly long period, for example since installation of the machine.

All this data will be transferred from a battery powered RAM in the controller 20 to the module 24. In addition, the controller 20 is operable to write into the locations of the module 24 which contain the security codes a predetermined indication code.

At a later stage, when the module 24 is inserted into the down-loading machine 26 the data is read out of the module and used to print out a transaction record. In this embodiment, the down-loading machine 26 can access the data only on condition that the indication code is present in the module. The indication code is thus referred to herein also as the "access" code. The down-loading machine 26 erases all the data in the module 24, and writes-in the appropriate security codes, which are continuously stored in the down-loading machine 26.

The data link 18 is used to transfer the transaction data into the battery powered RAM of the controller 20. Depending upon the type of data, this occurs either at the time a transaction is carried out, or when an audit is requested by inserting a module (and pressing the request button, if provided, on the controller 20). The data may originate at the coin mechanism 4, the vending machine controller 6, or (if applicable) the card reader 22. All data is, however, transferred under the control of the coin mechanism 4.

Information is transmitted on the data link 18 in the form of eight-bit bytes, each of which is transmitted with a start bit, a stop bit and a parity bit. Information is transmitted always between the coin mechanism 4 and one of the peripherals 6, 20 and 22.

When the communication is from the coin mechanism, the three most significant bits indicate the peripheral involved in transmission. The next most significant bit indicates the nature of the communication, i.e. whether it is a command or data. The other four bits either indicate the nature of the command or consist of data.

Communication is established by the coin mechanism 4 sending a command to an appropriate peripheral. If the coin mechanism is to send data to the peripheral, then the peripheral replies by acknowledging that it is ready to accept the data. The data is then sent four bits at a time, and after each transmission the peripheral replies by acknowledging that the data has been received correctly. If the peripheral receives corrupted data, it replies with a "negative acknowledgement", which causes the coin mechanism to re-transmit the data.

If data is to be transmitted from the peripheral to the coin mechanism, then the peripheral indicates this in response to a request from the coin mechanism to transmit its status. The data is then transmitted one 8-bit byte at a time, each succeeding transmission being instigated by receipt of an acknowledgement from the coin mechanism that the preceding data has been received correctly. As above, a byte is re-transmitted if the coin mechanism sends back a negative acknowledgement.

The detailed procedure for communicating along the data link 18 may of course vary from that described.

The operations of the audit controller 20 and the down-loading machine 26, and those operations of the coin mechanism 4 which are concerned with the audit system, will be described in detail in the following. It is to be noted that most of the operations carried out by the items 4, 6, 8 and 22 are not concerned with the audit system, and indeed these items may be constructed in a per se known manner and operate according to known methods. For example, the coin mechanism 4 may be a unit available from Mars Electronics, Money Systems Division, Eskdale Road, Winnersh, Nr.Reading, Berks. RG11 5AQ, England, under the part number MS 1600. Those parts of the vending machine 2 which are not of primary concern to the operation of the audit system will therefore not be described.

The items 4, 20 and 26 to be described below each incorporate a central processor and other devices which are in themselves well known and commercially available items, and the devices are connected to the processors in per se known manners. The processors may, for example, be items available from Intel Corporation, 3065 Bowers Avenue, Santa Clara, Calif. 95051, U.S.A., under the part number 8039. This item has a range of accessories which can also be used, including port expanders available under the part number 8255A.

The specific hardware to be described can be modified substantially, and various alternative constructions capable of carrying out similar functions will be apparent to anyone skilled in the art.

Referring to FIG. 2, the coin mechanism 4 has a central processor 202 coupled via a data bus 204 to a non-volatile memory 206 which stores a program determining how the processor operates. The use of a memory which is external to the processor 202 facilitates modification of the program.

The memory 206 is addressed by the address bus 208 of the processor, the addresses being latched in a latch circuit 210.

The data bus 204 also communicates with a display controller 212, which controls both an internal display 214, which can be inspected by an operator when he is servicing the machine, and to an external credit display 216 which displays to a user how much credit he has accumulated when he is operating the vending machine.

The processor 202 also communicates via various input/output buses and interfaces with the validator 12, the separator 14, and the dispensing apparatus 16.

The central processor 202 also has access to the contents of an EAROM 218. This stores a variety of alterable parameters for determining the detailed operation of the various mechanisms during the carrying out of the coin mechanism's program. For example, it may be used to determine how long various gates are opened in the separator, the destinations of various coins, the coin scale factor referred to above, etc.

The processor communicates with the data link 18 via a buffer indicated at 220.

The processor 202 receives, via an interface 222, inputs from such devices as maintenance switches, which are used during servicing of the machine.

The coin mechanism 4 is capable of operating without the vending machine controller 6, in which case the coin mechanism will communicate directly with relays and indicators of a vending apparatus. For this purpose, the processor 202 may, if desired, communicate via a port expander 224 with an interface 226 coupled to the relays and outputs of the vending apparatus.

The operation of the coin mechanism will be described with reference to FIG. 3.

After the power has been turned on, the coin mechanism enters an initialisation routine following which, at point 302, the processor 202 enters an endless program loop in which the various devices connected to the processor are repeatedly polled.

For example, the processor can start by polling the validator, as shown in the flow chart of FIG. 3. This procedure involves looking at the signals from the validator to determine whether or not any action needs to be taken (i.e. whether a coin has been tested). If action does need to be taken, this is carried out at step 304 in accordance with well known procedures. At the end of those procedures, the processor 202 stores in its internal RAM a table of data describing the validator transaction which has just taken place. The processor then enters a "call audit" routine for transmitting this data to the audit controller 20.

After the polling of the validator, a "escrow" poll routine is entered. A servicing operation will be needed here if, for example, a user has finished a series of vending operations and has pressed an escrow return button to cause the change dispensing apparatus to dispense change in an amount equal to the excess credit. Again, any transaction data is delivered to the audit controller 20 using the same "call audit" routine.

The program then enters a "poll inventory" routine to determine whether any action needs to be taken as a result of an operator manually actuating mechanisms for dispensing coins from the change tubes, which may occur during servicing. This can also result in the "call audit" routine being entered to transfer transaction data to the audit controller 20.

The above operations have involved the processor in polling items forming part of the coin mechanism, by looking at the signals from those items. The program then enters a "poll audit system" routine, which involves one of the peripherals and therefore requires the processor 202 to send a signal to that peripheral along the data link 18.

In this case, the processor 202 sends a "STATUS" signal to the audit controller 20. The controller 20 will reply with a signal indicating whether or not the controller 20 needs servicing, which may occur when a user performs an audit by inserting a module 24 into the controller 20.

If servicing is required, the program enters a "service audit" routine to be described later.

Subsequently, the coin mechanism enters a "poll VMC" routine in which it transmits a "STATUS" signal to the vending machine controller 6. If the vending machine controller 6 does require servicing, for example because it has just caused the vending apparatus 8 to dispense a product, it will indicate this to the coin mechanism 4. This will cause the mechanism to enter a "service VMC" routine. This may, for example, involve decrementing an accumulated credit in the coin mechanism 4 by an amount corresponding to the dispensed product. At the end of this routine, the coin mechanism 4 will send to the vending machine controller 6 a request for any audit data (i.e. data to be sent to the audit controller) to be transmitted. As a result, the coin mechanism 4 will receive any such data from the vending machine controller 6, and will then enter the "call audit" routine to send the data to the audit controller 20.

The processor 202 then polls the maintenance switches to determine whether any action needs to be taken in response to a user servicing the apparatus.

Subsequently, the card reader 22 is polled by sending a "STATUS" signal. If servicing is required, this is carried out prior to the coin mechanism 4 requesting the card reader 22 to send it any audit data. The audit data is then delivered from the coin mechanism 4 to the audit controller 20 using the "call audit" routine.

The program then loops back to step 302.

The "request audit data" routine is shown in FIG. 4. The coin mechanism first sends to the appropriate peripheral a command for that peripheral to transmit the amount of audit data which is required to be sent from the peripheral. The peripheral replies by transmitting this amount, which is then stored in a counter, which may comprise one of the processor's internal registers. The coin mechanism then instructs the peripheral to send the first item of data. It should be noted that each item of audit data transmitted between the coin mechanism and the various peripherals consists of both an address and a data value. The address represents a particular memory location in the controller 20 at which the data is to be stored. This location will correspond to a location in the module 24 to which the data value will eventually be transferred. Each address and each data value comprises eight bits.

The protocol in this embodiment is for the address data to be sent first, as shown in FIG. 4, followed by the data value itself. Each of these is stored at an appropriate position in a table stored in the internal RAM of the processor 202.

The counter is then decremented to determine whether the data transmission has finished. If not, the routine of sending an address followed by data value is repeated.

At the end of this routine, the internal RAM will store a complete table of audit data, including address values and data values. There will also be a register indicating how much data is stored in the table.

The table is set up in the same way if audit data is to be transmitted following the polling of the coin mechanism's own devices, such as the validator.

The table of data is then transmitted using the call audit routine shown in FIG. 5. A counter is set up with a value indicating the size of the table (i.e. the amount of audit data to be transmitted). An address is transmitted by sending two successive data transfers, each containing four bits, to form the eight bit address. The data value itself is then transmitted by sending two more successive data transfers. The counter is then decremented to determine whether the entire table has yet been transmitted. If not, further address and data are transmitted until the entire table has been sent.

Preferably, the procedures referred to above for sending address and data values are supplemented by sending, after each pair of address and data values, a synchronisation byte to avoid problems which could arise if the transmission and reception of address and data values became out of synchronisation.

The "service audit" routine is shown in FIG. 6. This routine is entered if the audit controller 20 replies to a "STATUS" request by indicating that an audit has been requested.

The purpose of this routine is to transmit to the audit controller that information which is needed only once per audit, such as identification numbers, the coin scale factor, etc., as distinct from that information which is sent after every transaction.

The coin mechanism starts by sending to one of the peripherals, for example the vending machine controller 6, a command to send the required type of data to the coin mechanism. Such data is entered into the internal RAM of the processor and then transmitted to the audit controller, for example using the "call audit" routine described previously. If desired, to save memory space, the coin mechanism can be arranged to receive and retransmit a single item of information (i.e. a single pair of address/data values) at a time, rather than receiving all the information before re-transmitting it to the audit controller.

The coin mechanism then determines whether all the necessary peripherals have been accessed in this manner, and if not the above routines are repeated.

After all the peripherals have been accessed, the coin mechanism gathers together in the internal RAM of the processor 202 all the relevant data concerning its own devices, such as the identification of the coin mechanism, and then transmits this to the audit controller, following which the coin mechanism transmits to the controller an "END" command indicating that the controller now has all the necessary data. The "END" command need not be a unique code; in the preferred embodiment it is simply a further "STATUS" command, but because the audit controller 20 has been receiving data, it recognises that the "STATUS" command is now being used to indicate that the transfer of data has been completed.

The audit controller 20 is shown in FIG. 7. This has a central processor 702, which has its data and address buses 704 and 706 connected to a program memory 708, in the latter case via an address latch 710. These buses are also connected to a random access memory 712 which is powered by a battery source indicated at 714.

The data bus 704 is also connected to a standard UART 716, which in this case is used to handle the communication along the data link 18 to which it is connected via a buffer 718.

The audit controller 20 of the present embodiment can be used with EAROM modules 24 and with "intelligent" modules, referred to as probes (not shown), which communicate using an infrared data link. For this purpose, the central processor 702 is connected via an interface 720 to a socket 722 for the EAROM of the module 24. The processor is also connected via an input controller 724 to circuits 726 for transmitting and receiving data via the infrared data link. The input control circuit 724 is itself controlled by the output of a port expander 728 connected to various inputs, indicators, etc. via an opto-isolator interface 730 and driver circuitry 732.

FIG. 8 illustrates the operations carried out by the processor 702 of the audit controller 20.

After the power has been turned on and an initialisation routine has been carried out, the program enters a loop in which it waits for a signal from the coin mechanism. Once the signal has been received, the processor then determines whether the signal contains a command or data. Assuming that this is the first signal to be received, then it should be a command.In this case, the program then proceeds to determine whether an audit has been requested by a user.

This request is carried out by inserting a module 24, and pressing a request button if provided (or by operating an infrared probe in a per se known manner). Assuming no audit has been requested, then an appropriate reply is set up and then transmitted to the coin mechanism, following which the controller again enters the loop in which it waits for a signal from the coin mechanism.

If, however, the program determines that an audit had been requested, the program then determines whether or not a flag "A" has been set: the purpose of this will become apparent.

Assuming that the flag is not set, which would be the situation if this is the first command received from the coin mechanism, the next stage determines whether or not the request for the audit is a valid one.

Firstly, the module 24 or probe, whichever is in use, is read in order to access two security codes stored there in. One of these, referred to as the "OLD" security code, is tested to determine whether it matches the security code which is stored in the audit controller.

Normally, the codes will match, and the program proceeds to determine whether or not the other security code from the module 24 or probe (which is referred to as the "NEW" code), matches the "OLD" code. Normally, these will also be the same, in which case the program will proceed to set the flag "A" which was mentioned above. This flag therefore indicates that a valid audit request has been made by using a module 24 or probe containing a correct security code.

The audit controller then sets up an appropriate reply which is then transmitted to the coin mechanism, following which the audit controller will wait for a further signal from the coin mechanism.

The reply which the controller has just sent to the coin mechanism, which was in response to a "STATUS" request sent during polling by the coin mechanism, would have caused the coin mechanism to enter the service audit routine. Thus, the coin mechanism will then start transmitting data to the audit controller.

The next signal from the coin mechanism will be detected as data, and two successive transmissions of 'address' data will be used to set up an address for the battery powered RAM 712, so that further data received from the coin mechanism can then be entered into that RAM. (Note that the actual routine shown has been slightly simplified for ease of understanding; the procedures of setting up an address and setting up data would not be carried out in succession as shown, but would be carried out progressively in response to successive bytes of data sent by the coin mechanism).

After all the necessary information has been sent to the controller, the coin mechanism then sends the "END" command to indicate that the controller and proceed with the requested audit.

After detection of this command, the program determines that the audit is still being requested (this request having been latched), and then proceeds to determine that the flag "A" has now been set. At the next stage, the flag is reset, so that any subsequent audit requests would cause the controller again to enter the routine for testing the security code.

After resetting the flag, the program determines whether a probe or a module 24 is in use. If a probe is in use, the data from the battery powered RAm 712 is delivered to the probe using the infrared transmitter in a conventional manner. A flag "B" is tested, and would normally be found not to be set, following which the data in the battery powered RAM 712 which makes up the "interim" record referred to above is erased. The controller then sets up an appropriate reply which is transmitted to the coin mechanism. That ends the audit procedure.

If the program determines that a module 24, rather than a probe, is in use, then the procedures for reading out the data in the battery powered RAM 712 are different. In this case, a counter indicating how much data has to be transmitted to the module is set up. The first byte of data in the RAM 712 is then entered into the module 24. The processor 702 then reads back that byte of data to determine whether or not it is equal to the data which was transmitted. This would normally be the case, and the program would then decrement the counter to determine whether the transfer is completed, and if not repeat the above procedure for the next byte in the battery powered RAM 712. If, at any stage, the byte read out of the module 24 differs from that which was sent to the module, an alarm is given, and an appropriate reply is set up and transmitted to the coin mechanism, at which point the audit ends. Such a procedure would occur if the module 24 is inadvertently or deliberately removed from the controller 20 during the data transfer.

Assuming that all the data has been transferred correctly, the processor then stores an access code in the module 24. In the preferred embodiment, this access code over-writes both the OLD and NEW codes referred to above. (Over-writing the security codes prevents the module from being re-used inadvertently before the data has been down-loaded. However, this over-writing could be achieved in other ways, and it is not essential that the access code be placed in the security code locations).

The program then proceeds to the step in which the flag "B" is tested, and if set the "interim" records are deleted as described above. An appropriate reply is set up and transmitted to the coin mechanism to end the audit.

The above description outlines the procedures which obtain under normal circumstances when the controller is polled by the coin mechanism and an audit has or has not been requested. In addition, as described above, data may be transmitted to the controller 20 at other times by the "call audit" routine. Any such data is written into the battery powered RAM 712 at addresses which are also transmitted by the coin mechanism. If the data relates to the "interim" record referred to above, then the controller can be arranged automatically to add this data to other data stored in the battery powered RAM 712, which other data forms part of the "total" record referred to above.

Assuming that an owner is unable for some reason to use his OLD security code, then access to the audit system can still be achieved by storing in the module or probe a "skeleton" code in the place normally occupied by the OLD security code.

The processor 702 will find, on requesting an audit, that there is no match between the OLD security code and the stored security code, and accordingly will proceed to step 822. Here, the processor determines whether the "skeleton" code matches a "KEY" code stored in the controller. This key code is common to many, or all, audit systems made by a particular manufacturer. It could be used simply to allow transaction data to be transferred to the module, or to alter the ordinary security code stored in the controller. However in the preferred embodiment, it is used to instruct the audit controller to store in the module the ordinary security code, so that the manufacturer or owner can read this out of the module and so learn the correct value for the OLD security code.

Accordingly, if a match is found at step 822, the flag "B" is set, following which the flag "A" is set to indicate that access to the controller's data is permitted. Subsequently, after data has been transferred to the module or probe, the program will then proceed to store the security code into the module, instead of erasing the interim data, because the flag "B" has been set.

Because, in this situation, the interim file has not been deleted, subsequent audits will not be affected by this operation.

The above arrangement could be modified by arranging for the access code to be stored in the module only if flag B is not set (i.e. only if access if achieved with a security code, rather than a skeleton code). This would produce an added measure of security because, as explained further below, a user's down-loading machine will only operate correctly if the module contains the access code. Thus, even if someone managed to discover the skeleton code, he would not be able to use it to access and then read out a security code stored in an audit controller. The manufacturer would have special down-loading machine which would not be subject to this restriction.

The controller of the illustrated embodiment permits the security code stored therein to be altered in an easy manner. This is achieved by the user entering into the module 24 (or probe) after down-loading data a new value for the security code NEW. The OLD code is retained.

The next time the module (or probe) is used for an audit, then the controller will determine at step 820 that the NEW code is different from the OLD code. As a result, the processor 702 alters its stored security code so that it is equal to the NEW code. In future operations of the controller, therefore, access can be gained using modules or probes for storing the new security code.

However, an owner may have modules, which would probably not be dedicated to particular audit systems. There is therefore a reasonable possibility that during the course of altering the security codes in a number of different audit systems, an audit may be requested using a module containing both the old security code (OLD) and the new security code (NEW), but where the security code in the controller itself has already been updated to the new value.

This situation is, however, provided for because the controller will, after determining that the OLD security code does not match the stored security code, and that the KEY code is not matched, go on to test at step 824 whether the NEW security code is equal to the stored code. If so, the flag "A" is set to indicate a valid audit request.

If the controller fails to find the correct security code or skeleton code in the module 24 or probe after an audit has been requested, it then tests whether the value stored in the security code location corresponds to the access code. This would be the situation if the user accidentally tried to re-use a module 24 or probe which already contained transaction data. If a match is found, the controller sends the reply indicating that no audit has been requested. Otherwise, the controller assumes that an unauthorised audit request has been made, and the reply is preceded by a delay of approximately a minute, so as to render impracticable any attempt to access the controller by repeatedly guessing the security code.

It will be noted that the over-writing of the security code with the access code, as described previously, prevents accidental erasure of the contents of a module which would occur if the module is inadvertently used for a second time, whereby the data in the module would be over-written by new data.

The down-loading machine is shown in FIG. 9. This has a central processor 902 provided with input/output buses 904, an address bus 906 and a data bus 908. The processor is coupled in a standard manner to a program memory 910, a random access memory 912 having a back-up battery power supply 914, and port expanders 916.

The input/output buses 904 communicate via an interface 918 with a socket 920 for the module 24, and with a peripheral select decoder 922, which is controlled by one of the port expanders 916, and which allows selective communication between the processor 902 and an infrared sensor/transmitter circuit 924, the printer 28, a "data box" 926, and an external computer terminal 928, the latter three devices being connected via interface logic 930. The data box 926 and computer terminal 928 are optional, and permit storage and/or processing of a range of transaction data relating to different vending machines.

The port expanders 916 are also connected to a display module 932 and, via an interface 934, a keyboard 936. A user can operate the down-loading machine 26 by pressing the keys of the keyboard 936 and observing the entered data on the display module 932.

One of the port expanders 916 is also connected to a real-time clock/calendar 938 which is also able to receive power from the back-up battery power source 914.

The operation of the down-loading machine is illustrated in FIG. 10.

After the machine has been switched on, and an initialisation routine has been carried out, the processor 902 enters a loop until an instruction has been received from the keyboard 936. One of five instructions can be entered, which are respectively detected at steps 1002, 1004, 1006, 1008 and 1010 of FIG. 10.

The first instruction, detected at step 1002, is for altering security codes. The down-loading machine 26 stores in the memory 912 the OLD and NEW security codes referred to above, which are normally the same. Using the first instruction, it is possible to alter these codes, which will eventually result in the audit systems in the field storing updated security codes.

On detection of that instruction, the machine then waits for the current security code to be correctly entered. If this is not correctly entered, the program simply loops back to the keyboard detection routine. Otherwise, the user is allowed to enter a new security code using the keyboard 936.

In the preferred embodiment, before a new security code is entered, the machine is operable to compare this with certain selected "unallowable" security codes, and only permits the new security code to be entered if no match is found. Thus, it is possible to reserve certain codes, such as the skeleton code referred to above, for special use. The manufacturer's own down-loading machine would, of course, be capable of using these reserved codes.

The second instruction, detected at step 1004, is for down-loading the contents of a module 24. If this instruction is detected, the module is inspected to determine whether or not the access code referred to above is present. If it is not present, down-loading will not be permitted. Assuming that the code is present, then the data in the module is transferred to the RAM 912, and a file type is determined in accordance with stored data in the module. If the access code is not present, a different "error" file type is set up.

The program then proceeds to a step in which a file pointer is arranged in accordance with the file type. That is to say, the processor 902 determines which of a plurality of different output formats will be selected prior to actually printing an output at step 1012.

If the "error" file type was set up, then the file pointer will point to a stored error message which is then printed out. If the file type was set in accordance with stored data in the module, then one of several transaction data output formats is selected by the file pointer. This permits different types of data to be recorded in the module for different audit systems, but nevertheless printed out in an appropriate format and with appropriate indications of the contents of the data.

For example, one type of vending machine, may be arranged to store in the audit controller data indicative of how many products of different prices have been dispensed. This type of data would be represented by a particular file type which would be entered with the data in the module.

On down-loading the file type would cause the file pointer to point to a particular format in which the printer prints codes representing the respective prices together with, for each of these prices, the number of products vended.

In other arrangement, a vending machine may be able to store more sophisticated data, such as the actual type of each product vended. A different file type would be recorded in the module, so that on down-loading the file pointer would point to a different format which would type out more detailed information, such as the name of each product together with the number of such products dispensed.

The third instruction which can be entered using the keyboard is for reading a probe. If this instruction is encountered, the probe data is delivered in a standard manner to the RAM 912. A test is made to ensure that the data has been transferred correctly, and if so, the program proceeds to set the file type just as if the data had been received from a module. Otherwise, an "error" file type is set up.

The other instructions, detected at steps 1008 and 1010, respectively, are used to erase the module or probe, respectively, after down-loading.

In both cases, the OLD and NEW security codes stored in the down-loading machine are gathered together and written into the module or probe. The rest of the contents of the module or probe are set to zero.

Although not described above, it is also possible to add to the system a further feature which is considered independently advantageous, and which involves storing in the module a "clear-down" code. This would be detected by the audit controller 20 in much the same way as it detects the KEY code, but instead of simply authorizing access to the transaction data, the clear-down code would cause all the data stored in the controller including both the "interim" and the "total" records, to be cleared. This would be useful for clearing data which may have been entered into the controller during testing of the system by the manufacturer before actual installation of the system, and also would be useful if the customer wished to take the system out of service and then install it in a different vending machine.

In the above embodiment, the controller 20 received all the audit data along the data link 18. However, the controller 20 could also have its own individual data ports for detecting further information, such as the opening of a door of the vending machine or the use of a key by an attendant, to form part of the audit data.

It will be appreciated that the audit system of the invention can be used not only with vending machines, but also with other apparatus, such as change-giving machines, amusement or games machines, etc.

The invention is also useful in areas other than cash- and credit-handling machines. It is of value in any system in which data is gathered at a remote location and transferred to a central location by collection in an intelligent or non-intelligent module.

What is claimed is:

1. A data collection system for a machine which generates data relating to its operation, the system comprising data collection means having a removable data storage module into which the collection means is operable to load said operation data, characterised in that the collection means is further operable to check that the data has been correctly loaded into the module, and, if so, to store in the module a predetermined indication code, which after removal of the module from the collection means can be recognised and thereby used as an indication that a successful operation data transfer has taken place.

2. A system as claimed in claim 1, wherein the module stores a security code, the collection means is operable to perform a security code recognition operation on the module to determine whether the stored security code is appropriate to authorise loading of operation data, and the collection means is operable to load the operation data into the module on condition that the stored security code is appropriate.

3. A system as claimed in claim 2, wherein the collection means is operable to alter or delete the security code stored in the module.

4. A system as claimed in claim 3, wherein the collection means is operable to substitute said predetermined indication code for the security code stored in the module.

5. A system as claimed in claim 2, wherein the collection means is responsive to an alteration instruction stored in the module to modify its security code recognition operation so as to recognise a different security code as being appropriate.

6. A system as claimed in claim 5, wherein the collection means is so responsive on condition that the module also stores the currently appropriate security code.

7. A system as claimed in claim 5, wherein the alteration instruction comprises said different security code.

8. A system as claimed in claim 7 wherein said security code recognition operation comprises checking a security code region and an alteration instruction region in the module, and wherein the collection means authorises loading of operation data if either of the regions stores the currently appropriate security code.

9. A system as claimed in claim 7, wherein the collection means is operable to examine a first predetermined location in a module during the security code recognition operation to determine whether an appropriate security code is stored therein, and is operable to examine a second predetermined location in the module, and to determine that an alteration instruction is present if the contents of the second predetermined location differ from those of the first predetermined location.

10. A system as claimed in any one of claims 2 to 9, wherein the collection means is operable to determine as appropriate a first security code which is peculiar to that collection means, and a second security code which is common to that collection means and other collection means.

11. A system as claimed in any one of claims 2 to 9, said collection means including an electrical connector for receiving the module and communicating signals between the module and the collection means.

12. A system as claimed in claim 11, wherein the module comprises non-volatile memory locations into which the collection means is operable to store said operation data and which are operable to retain said operation data after removal of the module from the collection means, the collection means being operable to check that the data has been correctly loaded into the module by reading out the contents of said memory locations.

13. A system as claimed in any one of claims 2 to 9, further comprising a down-loading device which is operable to receive said module and to extract the operation data therefrom in order to prepare a record of said data.

14. A system as claimed in claim 13, wherein said device is operable to extract and prepare a record of said data on condition that said predetermined indication code is stored in said module.

15. A system as claimed in claim 14, wherein the down-loading device is operable to provide an error indication if said predetermined indication code is not stored in said module.

16. A system as claimed in any one of claims 2 to 9, including entry means which stores a security code and which can be caused by a user to enter its stored security code into a module so that the module can subsequently be used for receiving operation data.

17. A system as claimed in claim 16, wherein said entry means is arranged to permit alteration of its currently stored security code on condition that a user first enters into it said currently stored security code.

18. A system as claimed in any one of claims 2 to 9, in combination with a cash- or credit-handling machine, the data collection means being operable to collect data relating to transactions carried out by said machine.

19. A data collection system for a machine which generates data relating to its operation, the system comprising data collection means having a removable data storage module into which the collection means is selectively operable to load said operation data, the module storing a security code and the collection means being operable to perform a security code recognition operation on the module to determine whether the stored security code is appropriate to authorize loading of operation data, wherein the collection means is operable to determine as appropriate a first security code which is peculiar to that collection means, and a second security code which is common to that collection means and other collection means.

20. A system as claimed in claim 19, wherein the collection means is responsive to an alteration instruction stored in the module to modify its security code recognition operation so as to recognise a different security code as being appropriate.

21. A system as claimed in claim 20, wherein the collection means is so responsive on condition that the module also stores the currently appropriate security code.

22. A system as claimed in claim 20, wherein the alteration instruction comprises said different security code.

23. A system as claimed in claim 22, wherein said security code recognition operation comprises checking a security code region and an alteration instruction region in the module, and wherein the collection means authorises loading of operation data if either of the regions stores the currently appropriate security code.

24. A system as claimed in claim 22, wherein the collection means is operable to examine a first predetermined location in a module during the security code recognition operation to determine whether an appropriate security code is stored therein, and is operable to examine a second predetermined location in the module, and to determine that an alteration instruction is present if the contents of the second predetermined location differ from those of the first predetermined location.

25. A system as claimed in any one of claims 19 to 24, further comprising a down-loading device which is operable to receive said module and to extract the operation data therefrom in order to prepare a record of said data.

26. A system as claimed in any one of claims 19 to 24, including entry means which stores a security code and which can be caused by a user to enter its stored security code into a module so that the module can subsequently be used for receiving operation data.

27. A system as claimed in claim 26, wherein said entry means is arranged to permit alteration of its currently stored security code on condition that a user first enters into it said currently stored security code.

28. A system as claimed in any one of claims 19 to 24, in combination with a cash- or credit-handling machine, the data collection means being operable to collect data relating to transactions carried out by the machine.

29. A system as claimed in any one of claims 2 to 9, wherein the collection means is operable to determine as appropriate a first security code which is peculiar to a particular group of collection means, and a second security code which is common to the particular group of collection means and to collection means outside said group.

30. A data collection system for a machine which generates data relating to its operation, the system comprising data collection means having a removable data storage module into which the collection means is selectively operable to load said operation data, the module storing a security mode and the collection means being operable to perform a security code recognition operation on the module to determine whether the stored security code is appropriate to authorize loading of operation data, wherein the collection means is operable to determine as appropriate a first security code which is peculiar to a particular group of collection means, and a second security code which is common to the particular group of collection means and to collection means outside said group.

* * * * *

UNITED STATES PATENT AND TRADEMARK OFFICE
CERTIFICATE OF CORRECTION

PATENT NO. : 4,611,205

DATED : September 9, 1986

INVENTOR(S) : Eglise

It is certified that error appears in the above-identified patent and that said Letters Patent is hereby corrected as shown below:

Column 3, line 37, delete "could" and insert --would--.

Column 20, line 47, delete "mode" and insert --code--.

Signed and Sealed this

Fourteenth Day of June, 1988

*Attest:*

DONALD J. QUIGG

*Attesting Officer*

*Commissioner of Patents and Trademarks*

UNITED STATES PATENT AND TRADEMARK OFFICE

CERTIFICATE OF CORRECTION

PATENT NO. : 4,611,205

DATED : September 9, 1986

INVENTOR(S) : Eglise

It is certified that error appears in the above-identified patent and that said Letters Patent is hereby corrected as shown below:

Column 4, line 45, "is" should read -- it --.
Column 7, line 21, "time" should read -- times --.
Column 17, line 14, "other" should read -- another --.

Signed and Sealed this

Thirtieth Day of August, 1988

*Attest:*

DONALD J. QUIGG

*Attesting Officer*

*Commissioner of Patents and Trademarks*